United States Patent
Champlin et al.

(10) Patent No.: US 7,984,334 B2
(45) Date of Patent: Jul. 19, 2011

(54) CALL-STACK PATTERN MATCHING FOR PROBLEM RESOLUTION WITHIN SOFTWARE

(75) Inventors: Jonathan D. Champlin, Cold Spring, NY (US); Arthur H. Thomas, Chelmsford, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/618,304

(22) Filed: Nov. 13, 2009

(65) Prior Publication Data

US 2010/0064179 A1 Mar. 11, 2010

Related U.S. Application Data

(63) Continuation of application No. 11/203,534, filed on Aug. 12, 2005, now abandoned.

(51) Int. Cl.
G06F 11/00 (2006.01)
(52) U.S. Cl. .............................. 714/38; 714/4
(58) Field of Classification Search .............. 714/4, 38
See application file for complete search history.

(56) References Cited

U.S. PATENT DOCUMENTS

| | | | |
|---|---|---|---|
| 5,446,880 A | 8/1995 | Balgeman et al. | |
| 5,666,481 A | 9/1997 | Lewis | |
| 5,768,501 A | 6/1998 | Lewis | |
| 5,928,369 A | 7/1999 | Keyser et al. | |
| 5,983,364 A | 11/1999 | Bortcosh et al. | |
| 6,002,872 A | 12/1999 | Alexander et al. | |
| 6,553,507 B1 | 4/2003 | Cohen | |
| 6,598,090 B2 | 7/2003 | Champlin | |
| 6,681,344 B1 | 1/2004 | Andrew | |
| 6,691,064 B2 | 2/2004 | Vroman | |
| 6,742,141 B1 | 5/2004 | Miller | |
| 6,751,789 B1 | 6/2004 | Berry et al. | |
| 6,834,257 B2 | 12/2004 | Keller | |
| 7,039,833 B2 | 5/2006 | Knuutila et al. | |
| 7,051,320 B2 | 5/2006 | Claiborne | |
| 7,058,860 B2 | 6/2006 | Miller et al. | |
| 7,069,473 B2 | 6/2006 | Yasuda | |
| 7,127,499 B1 | 10/2006 | Accardi et al. | |
| 7,143,415 B2 | 11/2006 | Connelly et al. | |
| 7,155,514 B1 | 12/2006 | Milford | |
| 7,158,965 B1 | 1/2007 | Greenberg et al. | |
| 7,234,080 B2 | 6/2007 | Cirne et al. | |
| 7,257,743 B2 | 8/2007 | Glerum et al. | |
| 7,299,455 B2 | 11/2007 | Anderson et al. | |
| 7,328,376 B2 | 2/2008 | McGuire et al. | |
| 7,503,062 B2 | 3/2009 | Wong et al. | |
| 7,543,175 B2 | 6/2009 | Wood et al. | |
| 2003/0005414 A1 | 1/2003 | Elliott et al. | |
| 2003/0115582 A1 | 6/2003 | Hundt et al. | |
| 2003/0167454 A1 | 9/2003 | Jordanov et al. | |
| 2003/0215068 A1 | 11/2003 | Stein et al. | |
| 2004/0260474 A1 | 12/2004 | Malin et al. | |
| 2005/0102567 A1 | 5/2005 | McGuire et al. | |
| 2008/0147853 A1 | 6/2008 | Anderson et al. | |

*Primary Examiner* — Robert Beausoliel
*Assistant Examiner* — Joshua P Lottich
(74) *Attorney, Agent, or Firm* — Cuenot, Forsythe & Kim, LLC

(57) ABSTRACT

A method of diagnosing a fault condition within software can include, responsive to a fault condition within a computing system belonging to an organization, automatically sending call-stack information for the fault condition to a first server within the organization. Within the first server, the call-stack information for the fault condition can be compared with call-stack information from prior fault conditions that occurred within the organization to determine whether the call-stack information for the fault condition matches call-stack information from one of the prior fault conditions. The method further can include sending the call-stack information to a second server for comparison with call-stack information from prior fault conditions that occurred within at least one different organization if the call-stack information for the fault condition does not match.

25 Claims, 3 Drawing Sheets

CALL-STACK PATTERN MATCHING FOR PROBLEM RESOLUTION WITHIN SOFTWARE

CROSS-REFERENCE TO RELATED APPLICATIONS

This application is a continuation of application Ser. No. 11/203,534 filed on Aug. 12, 2005, in the U.S. Patent and Trademark Office, which is hereby incorporated by reference.

BACKGROUND

1. Field of the Invention

The present invention relates to fault detection and resolution in software-based systems.

2. Description of the Related Art

As the complexity of software-based systems increases, so too does the difficulty of identifying the source of faults, referred to as "crashes" or other anomalous behavior, within such systems. Often, when a particular software application is used across an entire organization, the same fault within the software application may be experienced by more than one user. This can lead to a significant amount of wasted time as users cope with "crashing" software applications. The possibility of data loss or corruption also exists. Presently, however, there is no reliable way of correlating software faults across an organization or to diagnose and solve the problem.

One attempted solution has been to rely upon the computer operating system to collect system and/or application execution information within a user's computer system. Upon detecting a fault condition, collected information is sent to a specified location. A typical implementation of this technique is when an application unexpectedly quits; the user is asked whether he or she wishes to send information about the fault condition. The fault information is sent as an electronic message to the manufacturer of the operating system.

This technique, however, does have disadvantages. One disadvantage is that whether information about the software fault is actually sent depends upon the user's decision to follow through with sending the information. If the user chooses not to send the information, the fault goes unreported. If the problem is widespread within a large organization, and users continually choose not to report the fault, the problem may go unnoticed for a significant period of time. As noted, this can lead to wasted time as well as possible data loss.

Another disadvantage is that even if a user chooses to send the fault information, it is provided to the operating system manufacturer. Neither the organization that is experiencing the software fault nor the developer of the software application causing the fault may be privy to the fault information. Both parties are likely to remain unaware of the frequency of any recurring software problems. As such, the problem can go unnoticed by system administrators of the organization experiencing the fault resulting in loss of productivity.

It would be beneficial to provide a mechanism for diagnosing and solving fault conditions within software-based systems which overcomes the limitations described above.

SUMMARY OF THE INVENTION

The present invention provides a solution for detecting and diagnosing software faults within an organization and/or across multiple organizations. One embodiment of the present invention can include a computer-implemented method of diagnosing a fault condition within software. The method can include, responsive to a fault condition within a computing system belonging to an organization, automatically sending call-stack information for the fault condition to a first server within the organization. Within the first server, the call-stack information for the fault condition can be compared with call-stack information from prior fault conditions that occurred within the organization to determine whether the call-stack information for the fault condition matches call-stack information from one of the prior fault conditions. The method further can include sending the call-stack information to a second server for comparison with call-stack information from prior fault conditions that occurred within at least one different organization if the call-stack information for the fault condition does not match.

Another embodiment of the present invention can include a system for diagnosing a fault condition within software. The system can include a computing system belonging to an organization. The computing system can execute software configured to detect a fault condition and, responsive to the fault condition, automatically transmit call-stack information corresponding to the fault condition to another computer system within the organization. The system also can include a server belonging to the organization. The server can be configured to receive the call-stack information and compare the call-stack information for the fault condition with call-stack information corresponding to prior fault conditions originating from computing systems belonging to the organization. The server further can be configured to determine whether the call-stack information for the fault condition matches call-stack information from one of the prior fault conditions. If not, the server automatically can transmit the call-stack information for the fault condition to a server that does not belong to the organization for further analysis.

Another embodiment of the present invention can include a machine readable storage being programmed to cause a machine to perform the various steps described herein.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
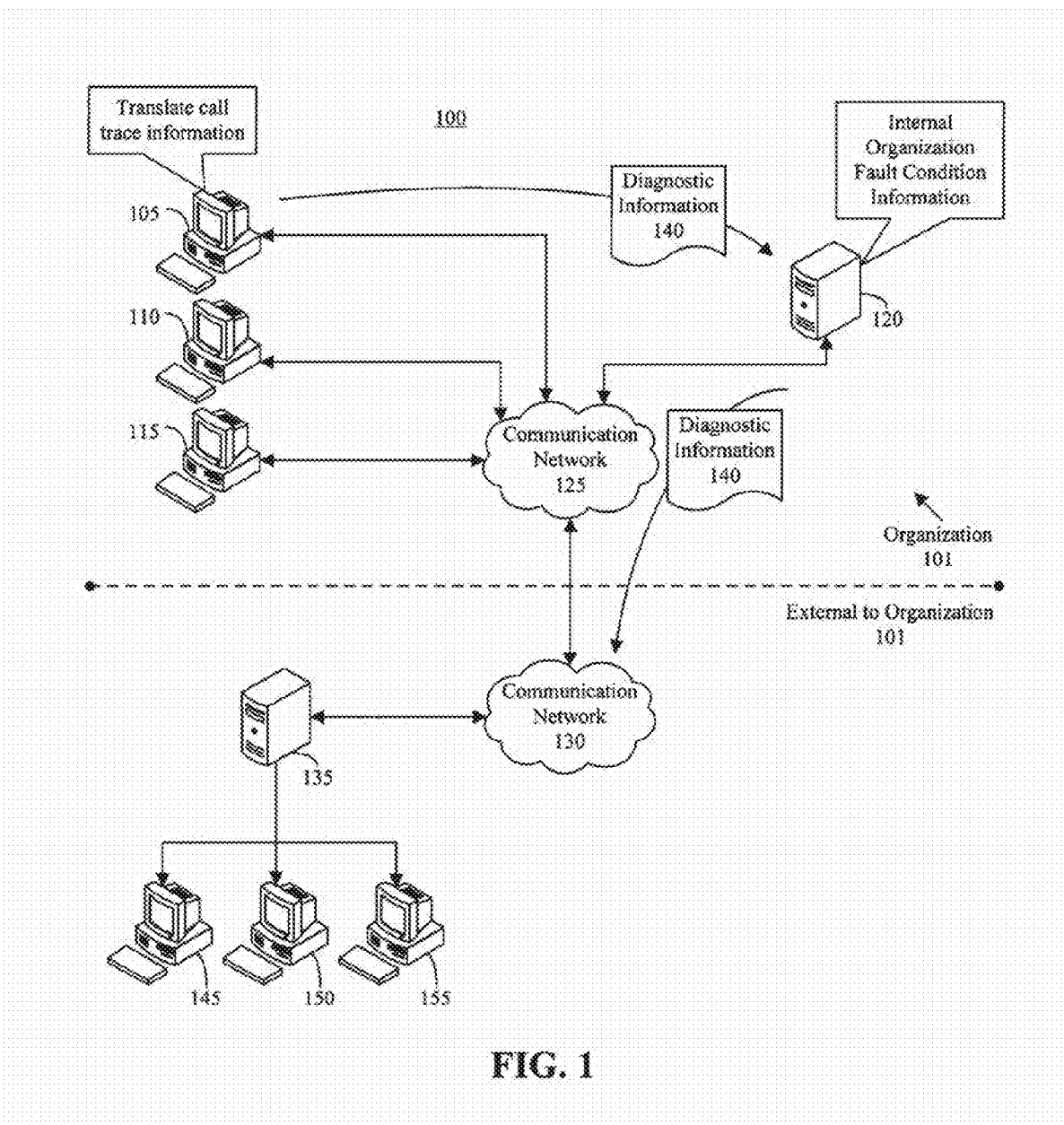
FIG. 1 is a schematic diagram illustrating a system configured for fault detection and resolution for a software-based system in accordance with one embodiment of the present invention.

The present invention provides a method, system, and apparatus for fault detection and resolution for use with software-based systems. In accordance with the inventive arrangements disclosed herein, a two tiered approach is presented where fault conditions are first matched with prior software faults that have occurred within an organization. In the event that the fault condition does not match prior software faults, the fault condition information is sent to an evaluation system which is not part of the organization. Typically, the outside evaluation system is associated with the developer and/or entity charged with administering the software system that experienced the fault condition. In any case, the outside evaluation system can compare the fault condition information with faults that have occurred across one or more different organizations to determine whether a solution exists.

While the specification concludes with claims defining the features of the invention that are regarded as novel, it is believed that the invention will be better understood from a consideration of the description in conjunction with the drawings, in which like reference numerals have been carried forward. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

FIG. 1 is a schematic diagram illustrating a system 100 configured for fault detection and resolution relating to a software-based system in accordance with one embodiment of the present invention. System 100 can include, a plurality of computer systems 105, 110, and 115 as well as a server 120, communicating through a communication network 125. In addition, system 100 can include another communication network 130, an additional server 135, and a plurality of analyst computer systems 145, 150, and 155.

Computer systems 105-115 can represent client and/or server computing machines which are part of, or belong to, an organization 101 such as a business, enterprise, or other entity. Each computer system 105-115 can execute software which has been configured to perform various fault detection and/or diagnostic functions which will be described herein in greater detail. In one embodiment, system 100 can be implemented using the Lotus Notes®/Domino® software architecture available from International Business Machines, Inc. of Armonk, N.Y. (IBM). In such an embodiment, computer systems 105-115 can be configured as Lotus® Notes® clients and/or as IBM Domino® servers.

Still, the present invention is not limited to such an implementation as the techniques disclosed herein can be applied to any of a variety of different software systems and/or architectures. Moreover, the fault detection techniques described herein can be applied to clients, servers, or both clients and servers. In addition, it should be appreciated that while only a limited number of computer systems are represented, that additional clients and/or servers can be included in system 100. Further, though hardware-based systems are depicted in FIG. 1, it should be appreciated that the terms "client" and "server" also can refer to software programs executing within suitable information processing systems.

Each of computer systems 105-115 can execute application software that is configured to detect any of a variety of different fault conditions. Examples of detectable fault conditions can include, but are not limited to, access violations, memory existing in an inconsistent state, or the like. In some cases, the computer operating system can send a notification, such as an exception, to an application which indicates that a fault condition has occurred. In other cases, the application itself can detect an internal fault condition.

Despite the particular manner in which fault conditions are detected, the application software executing on computer systems 105-115 can be configured to store diagnostic information 140. While different types of diagnostic information 140 can be stored or collected, in one embodiment, diagnostic information 140 can include call trace information for the software application that experienced, or was responsible for, the fault condition on the computer system. Other examples of diagnostic information 140 can include, but are not limited to information regarding open databases for crashing threads, operating system level information, application level information such as that which may be collected by an application such as IBM Lotus® Notes® or Domino®, etc. The call stack information, however, can be used for purposes of matching a fault condition with prior fault conditions to be described herein in further detail.

The computer systems 105-115 further can be programmed to translate the stack trace data to call-stack information. That is, the hexadecimal stack trace information can be translated into human-readable format which specifies a list of one or more functions of the application that were called, referred to as the call-stack information. In general, the call-stack information is an ordered list of functions that were executed by the software application that experienced the fault condition in the time leading up to the fault condition, or "crash".

When any of the computer systems 105-115 of the organization 101 detects a fault condition, the diagnostic information can be transmitted to the server 120 via communication network 125. Communication network 125 can be implemented as, or include, an intranet, a wide area network, a local area network, a virtual private network, a wireless network, the Internet, and/or the like, so long as communication network 125 represents communication pathways within, or belonging to, organization 101 of which computer systems 105-115 and server 120 belong or are connected.

Server 120 can be configured as a central repository for diagnostic information within organization 101. As such, server 120 can receive and store fault condition information 140 from any of computer systems 105-115 within organization 101. Accordingly, server 120 allows administrators within organization 101 to view all fault condition information which has been collected across the enterprise. As shown in FIG. 1, server 120 can receive diagnostic information 140 from computer system 105 and extract call-stack information from it. The call-stack information can be compared with call-stack information corresponding to prior fault conditions from any computer system within organization 101 to determine whether a match exists.

If no match exists, the call-stack information and/or diagnostic information 140 can be forwarded outside of organization 101 to server 135 via communication network 130. Communication network 130 can be similar to that of communication network 125 with the exception that communication network 130 includes pathways to computing resources outside of, or which are not part of, organization 101 to which computers 105-115 and server 120 belong.

In one embodiment, server 135 can be associated with, or belong to, an entity which is responsible for maintaining and/or developing the software application that experienced the fault condition within organization 101. In general, the server 135 can perform functions similar to those of server 120 in that received call-stack information can be compared with call-stack information from other fault conditions. Server 135, however, can include call-stack information from a plurality of different organizations making it possible to determine whether the fault condition has occurred in other organizations, i.e. outside of organization 101.

Server 135 further can route diagnostic information 140 to any of a plurality of analyst computer systems 145-155. Server 135 can maintain a record of the diagnostic and/or call-stack information and the particular analyst to which such information was sent. Thus, server 135 effectively maintains a list of analysts and the particular fault conditions upon which each analyst is working. Accordingly, when call-stack information is received for a given fault condition, that call-stack and/or diagnostic information can be forwarded to an analyst that is already working on a similar, or same, problem, whether for the same organization or for a different organization.

Figure 2A:
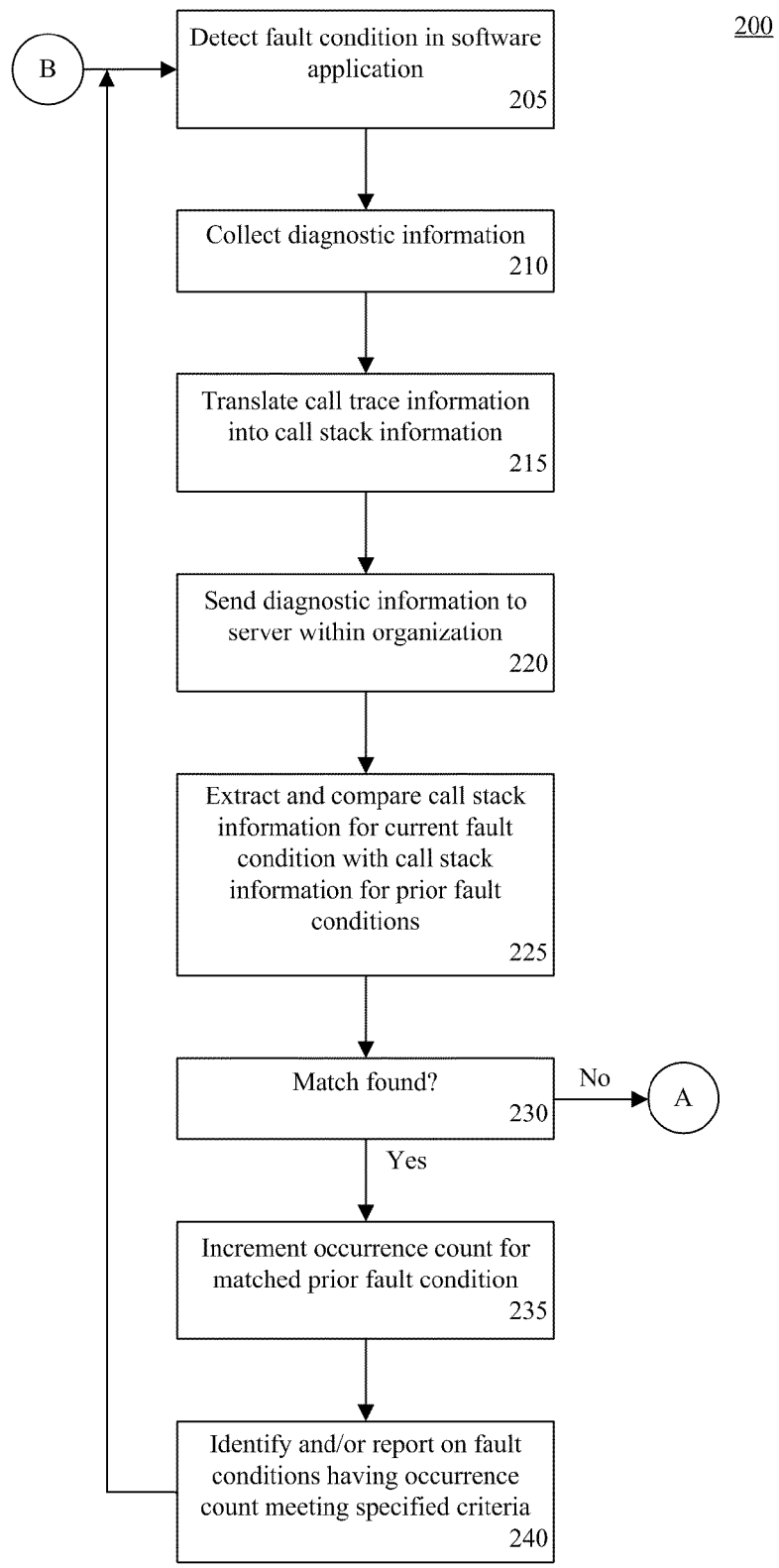
FIGS. 2A and 2B, taken together, are a flow chart illustrating a method of fault detection and resolution in accordance with another embodiment of the present invention.
Figure 2B:
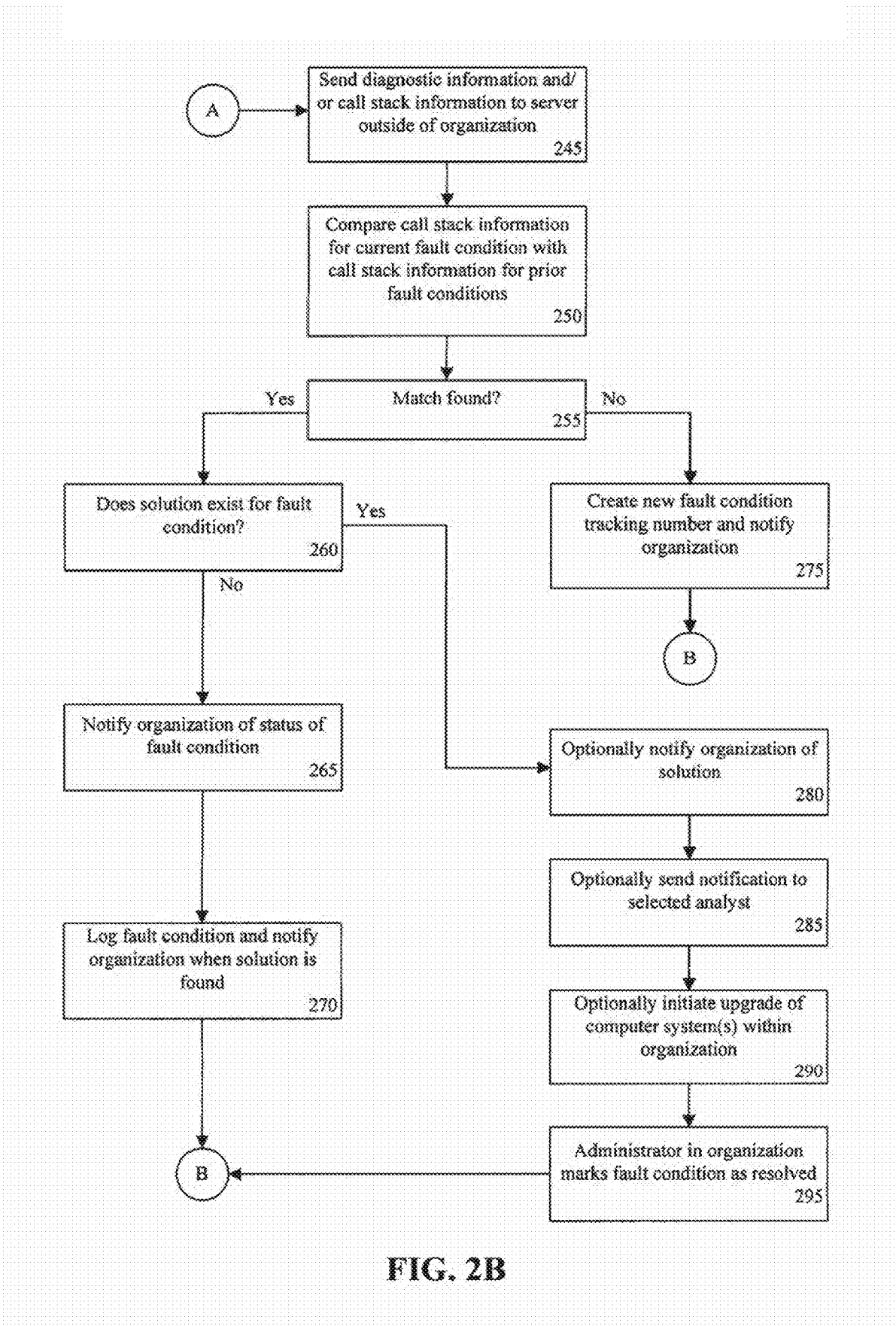

FIGS. 2A and 2B, taken together, are a flow chart illustrating a method 200 of fault detection and resolution in accordance with another embodiment of the present invention. While not limited to such an implementation, in one embodiment, method 200 can be performed using the system described with reference to FIG. 1. Method 200 can begin in a state where application software, configured to detect fault conditions and collect diagnostic information, is executing within either a client or a server of an organization.

Accordingly, in step 205, the application software can detect a fault condition. As noted, the fault condition can be detected internally within the application software, or the application software can receive a notification from the operating system of the computer system. Regardless of how the fault condition is detected, in step 210, diagnostic information can be collected and/or saved. The diagnostic information can include, but is not limited to, call trace information.

In step 215, the call trace information can be translated into call-stack information within the computer system prior to transmission. In step 220, the diagnostic information, which now includes the translated call-stack information, can be sent to a centralized server within the same organization as the computer system that experienced the fault condition. In step 225, the centralized server, having received the diagnostic information, can extract the call-stack information. The call-stack information corresponding to the fault condition can be compared with call-stack information for prior fault conditions that were experienced by computer systems belonging to the organization and which also were forwarded to the centralized server.

For example, a process can execute on the centralized server where diagnostic information is sent. The process can be notified when new diagnostic information is added to a particular server repository. When diagnostic information is delivered to the server repository, a fault analysis server task can extract the call-stack information from the diagnostic information. The fault analysis server task can use pattern matching technology to determine if the new call-stack information matches any previously received call-stack information.

Thus, in step 230, a determination can be made as to whether a match for the call-stack information was found. If so, the method can proceed to step 235. If not, the method can continue to step 245 in FIG. 2B. Continuing with step 235, an occurrence count associated with the matched, prior fault condition can be incremented within the centralized server. Incrementing the occurrence count signifies that the prior fault condition has been experienced again within the organization. By maintaining an occurrence count for each different fault condition recorded, the organization can determine those fault conditions that are problematic. It should be appreciated that time information also can be recorded for each fault condition making it possible to determine the frequency of each fault condition as well.

Step 240 is optional in nature and can be performed from time to time, or upon request of a system administrator. In step 240, the fault occurrence counts within the centralized server can be analyzed to identify any fault conditions which meet one or more established criteria. In one embodiment, for example, a system administrator can establish a minimum threshold. If a count for a particular fault condition meets or exceeds the threshold, the administrator can be notified and/or the fault condition having the count which met or exceeded the threshold can be identified as one which is significantly affecting the organization and which requires attention. In other embodiments, the established criteria can serve to identify fault conditions having occurrence counts within particular ranges, or to identify a fault condition having the highest occurrence count. After step 240, the method can loop back to step 205 to continue as may be required.

Proceeding to step 245 in FIG. 2B, in the case where the centralized server within the organization did not match the call-stack information, the centralized server can send the diagnostic information and/or the call-stack information for the detected fault condition to a server that is outside of, or does not belong to, the organization. In one embodiment, the server to which the diagnostic information is sent can be associated with an entity responsible for developing and/or administering the software application that experienced the fault condition.

In step 250, the call-stack information for the current fault condition can be compared with call-stack information for prior fault conditions from one or more different organizations. It should be appreciated that if the diagnostic information is sent, that the call-stack information can be extracted from the diagnostic information within the outside server prior to performing step 250. In any case, the comparison allows the call-stack information to be compared with call-stack information for fault conditions which have occurred in a variety of different organizations.

In step 255, a determination can be made as to whether a match for the call-stack information was found. If so, the method can proceed to step 260. If not, however, the method can continue to step 275, where a new fault condition tracking number can be created within the outside server. The fault condition tracking number can correspond to the call-stack information and associated fault condition. The outside server can notify the organization that sent the diagnostic information of the status of the fault condition, i.e, whether a solution exists, and continue to monitor for future occurrences of the fault condition as determined from call-stack information until such time that the fault condition is diagnosed and/or resolved. When the fault condition is diagnosed and/or resolved, the organization(s) that experienced and reported the fault condition can be notified of the solution and/or status of the fault condition. After step 275, the method can repeat as may be required.

In step 260, a determination can be made as to whether a solution exists for the fault condition corresponding to the matched call-stack information. If not, the method can proceed to step 265, where the organization that sent the diagnostic information can be advised that presently no solution exists. In step 270, the fault condition can be logged and the organization can be notified when a solution becomes available. After step 270, the method can repeat as may be required.

In the case where a solution does exist for the fault condition, the method can proceed to step 280. In step 280, the organization that reported the fault condition optionally can be notified of the existence of a solution. In one embodiment, the outside server can send a message and/or notification to the centralized server or an administrator within the reporting organization.

In step 285, a notification optionally can be sent to an analyst within the outside organization which developed and/or supports the software that experienced the fault condition. The analyst that is notified can be one that has been assigned to work on matching, prior fault conditions either with the reporting organization or with another organization that also experienced the same or similar fault condition. For example, in one embodiment, when an analyst works on a particular fault condition, that analyst can be associated with the fault condition and/or the call-stack information within the outside server. When subsequent reports of the same or a similar fault condition are received, as determined from the call stack information, the diagnostic information can be forwarded to the associated analyst. This ensures that fault conditions are dealt with by experienced personnel.

In step 290, if it is determined that the fault condition can be cured by upgrading the application software that experienced the fault to a newer release or version, then such a process can be initiated. In one embodiment, the server within the outside organization can notify the centralized server within the organization that by upgrading to a newer version or release of the application software, the fault condition will be cured. A system administrator within the organization can configure the client and/or servers to automatically download and install such upgrades upon notification from the centralized server within the organization. Accordingly, in cases where a fault condition is experienced in a widespread fashion across an organization, the fix can be automatically distributed to the afflicted computer systems.

In step 295, the administrator within the organization, after upgrading any afflicted computer systems, can mark the fault condition as being resolved within the centralized server. By marking the fault condition resolved, if call-stack information is subsequently received which corresponds to the resolved fault condition, it can be determined that the fault condition is actually a new fault condition despite having call-stack information which matches the resolved fault condition. Accordingly, the new fault condition can be considered one that is unrelated to the prior, resolved fault condition. Marking a fault condition as being resolved can be performed on a per version basis, or a per software release basis as the case may be.

Method 200 has been provided to better illustrate various aspects of the present invention. It should be appreciated that one or more steps of method 200 can be optionally performed, or can be performed in a different order than described herein without departing from the spirit of the invention. For example, it should be appreciated that an analyst can be notified of a fault condition whether a solution exists or not. This allows an analyst working on a particular fault condition to be notified any time such a fault condition arises. The analyst is thereby exposed to the varying circumstances in which the fault condition is detected in order to increase the likelihood that a solution will be found. In another example, the outside server can routinely send notifications to the system administrator of the organization or the centralized server as to the status of different fault conditions whether a solution exists, does not exist, or whether similar fault conditions have been logged or not.

The present invention can be realized in hardware or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, computer software can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of diagnosing a fault condition comprising:
   marking a fault condition, identifiable by call-stack information corresponding to the fault condition, resolved for a particular release of a software;
   responsive to detecting a subsequent fault condition, receiving, within a computer system, subsequent call-stack information for the subsequent fault condition that matches the call stack information for the fault condition that has been marked resolved; and
   determining, by the computer system, that the subsequent call-stack information indicates a fault condition that is unrelated to the fault condition that was marked resolved.

2. The computer-implemented method of claim 1, further comprising
   counting occurrences of fault conditions; and
   identifying a fault condition having an occurrence count that corresponds to at least one selected criterion.

3. The computer-implemented method of claim 2, further comprising selecting the criterion to be a minimum number of occurrences.

4. The computer-implemented method of claim 2, further comprising selecting the criterion to be occurrences of a fault condition having a minimum frequency.

5. The computer-implemented method of claim 1, further comprising:
   correlating fault conditions with analysts according to call-stack information; and
   automatically routing call-stack information for a selected fault condition to an analyst correlated with the call-stack information of the selected fault condition.

6. A computer-implemented method of diagnosing a fault condition within software comprising:

responsive to a fault condition within a computing system belonging to an organization, automatically sending call-stack information for the fault condition from the computing system to a first server within the organization;

within the first server, comparing the call-stack information for the fault condition with call-stack information from prior fault conditions that occurred within the organization to determine whether the call-stack information for the fault condition matches call-stack information from one of the prior fault conditions;

if the call-stack information for the fault condition does not match, sending the call-stack information to a second server for comparison with call-stack information from prior fault conditions that occurred within at least one different organization;

marking a fault condition resolved for a particular release of the software;

receiving subsequent call-stack information that matches the fault condition that has been marked resolved; and determining that the subsequent call-stack information indicates a fault condition that is unrelated to the fault condition that was marked resolved.

7. The method of claim 6, wherein the call-stack information of the fault condition matches the call-stack information from a prior fault condition within the first server, said method further comprising:

determining a frequency of occurrence of the prior fault condition; and identifying a fault condition having a frequency of occurrence that corresponds to at least one selected criterion.

8. The method of claim 6, wherein the call-stack information of the fault condition matches the call-stack information from a prior fault condition within the first server, said method further comprising:

incrementing an occurrence count for the prior fault condition; and identifying a fault condition having an occurrence count that corresponds to at least one selected criterion.

9. The method of claim 6, further comprising, prior to said automatically sending step, translating a call trace into a plurality of function names which comprise, at least in part, the call-stack information.

10. The method of claim 6, wherein the call-stack information is sent to the second server, said method further comprising:

matching the call-stack information of the fault condition with call-stack information for a prior fault condition that occurred within a different organization;

identifying an analyst assigned to the matching, prior fault condition; and automatically routing the call-stack information to the analyst.

11. The method of claim 6, wherein the call-stack information is sent to the second server, said method further comprising notifying the organization that sent the call-stack information for the fault condition whether the fault condition is a known issue.

12. The method of claim 6, wherein the call-stack information is sent to the second server, said method further comprising determining whether the fault condition is corrected by a newer release of the software.

13. The method of claim 6, wherein the call-stack information is sent to the second server, said method further comprising:

determining that the fault condition is corrected by a newer release of the software; and initiating an automatic update, within the computing system belonging to the organization, of the software to the newer release.

14. A system for diagnosing a fault condition within software, said system comprising:

a computing system belonging to an organization, said computing system executing software configured to detect a fault condition and, responsive to the fault condition, automatically transmit call-stack information corresponding to the fault condition to another computer system within the organization; and a server belonging to the organization, said server being configured to receive the call-stack information and compare the call-stack information for the fault condition with call-stack information corresponding to prior fault conditions originating from computing systems belonging to the organization, wherein the server is further configured to determine whether the call-stack information for the fault condition matches call-stack information from one of the prior fault conditions, and, if not, automatically transmits the call-stack information for the fault condition to a server that does not belong to the organization for further analysis, wherein the server further marks a fault condition resolved for a particular release of the software, receives subsequent call-stack information that matches the fault condition that has been marked resolved, and determines that the subsequent call-stack information indicates a fault condition that is unrelated to the fault condition that was marked resolved.

15. The system of claim 14, wherein the computing system translates a call trace into a plurality of function names which comprise, at least in part, the call-stack information prior to automatically transmitting the call-stack information to another computer system within the organization.

16. The system of claim 14, wherein the call-stack information of the fault condition matches call-stack information from a prior fault condition within the server, said server further being configured to increment an occurrence count for the prior fault condition and identify a fault condition having an occurrence count which corresponds to at least one selected criterion.

17. A non-transitory machine readable storage, having stored thereon a computer program having a plurality of code sections executable by a machine for causing the machine to perform the steps of:

responsive to a fault condition within a computing system belonging to an organization, automatically sending call-stack information for the fault condition to a first server within the organization;

within the first server, comparing the call-stack information for the fault condition with call-stack information from prior fault conditions that occurred within the organization to determine whether the call-stack information for the fault condition matches call-stack information from one of the prior fault conditions;

if the call-stack information for the fault condition does not match, sending the call-stack information to a second server for comparison with fault stack information from prior fault conditions that occurred within at least one different organization;

marking a fault condition resolved for a particular release of the software;

receiving subsequent call-stack information that matches the fault condition that has been marked resolved; and determining that the subsequent call-stack information indicates a fault condition that is unrelated to the fault condition that was marked resolved.

18. The machine readable storage of claim 17, wherein the call-stack information of the fault condition matches the call-stack information from a prior fault condition within the first server, the machine readable storage further causing the machine to perform the steps of:
   determining a frequency of occurrence of the prior fault condition; and
   identifying a fault condition having a frequency of occurrence that corresponds to at least one selected criterion.

19. The machine readable storage of claim 17, wherein the call-stack information of the fault condition matches the call-stack information from a prior fault condition within the first server, the machine readable storage further causing the machine to perform the steps of:
   incrementing an occurrence count for the prior fault condition; and
   identifying a fault condition having an occurrence count which corresponds to a selected criterion.

20. The machine readable storage of claim 17, further causing the machine to perform the step of, prior to said automatically sending step, translating a call trace into a plurality of function names which comprise, at least in part, the call-stack information.

21. The machine readable storage of claim 17, wherein the call-stack information is sent to the second server, the machine readable storage further causing the machine to perform the steps of:
   matching the call-stack information of the fault condition with call-stack information for a prior fault condition that occurred within a different organization;
   identifying an analyst assigned to the matching, prior fault condition; and
   automatically routing the call-stack information to the analyst.

22. The machine readable storage of claim 17, wherein the call-stack information is sent to the second server, the machine readable storage further causing the machine to perform the step of determining whether the fault condition is corrected by a newer release of the software.

23. The machine readable storage of claim 17, wherein the call-stack information is sent to the second server, the machine readable storage further causing the machine to perform the steps of:
   determining that the fault condition is corrected by a newer release of the software; and
   initiating an automatic update, within the computing system belonging to the organization, of the software to the newer release.

24. A non-transitory machine readable storage, having stored thereon a computer program having a plurality of code sections executable by a machine for causing the machine to perform the steps of:
   marking a fault condition, identifiable by call-stack information corresponding to the fault condition, resolved for a particular release of a software;
   responsive to detecting a subsequent fault condition, receiving, within a computer system, subsequent call-stack information for the subsequent fault condition that matches the call stack information for the fault condition that has been marked resolved; and
   determining, by the computer system, that the subsequent call-stack information indicates a fault condition that is unrelated to the fault condition that was marked resolved.

25. The machine readable storage of claim 24, further causing the machine to perform the steps of:
   counting occurrences of fault conditions; and
   identifying a fault condition having an occurrence count that corresponds to at least one selected criterion.

\* \* \* \* \*